United States Patent [19]

Hirata et al.

[11] Patent Number: 5,578,355

[45] Date of Patent: Nov. 26, 1996

[54] MAGNETO-OPTICAL DISK HAVING A MICROPOROUS PROTECTIVE COATING CONTAINING A LUBRICANT

[75] Inventors: Hideki Hirata; Hiroyuki Endo; Isamu Kuribayashi; Tsuyoshi Komaki, all of Nagano, Japan

[73] Assignee: TDK Corporation, Tokyo, Japan

[21] Appl. No.: 400,192

[22] Filed: Mar. 3, 1995

Related U.S. Application Data

[63] Continuation of Ser. No. 75,956, Jun. 14, 1993, abandoned.

[30] Foreign Application Priority Data

| Jun. 19, 1992 | [JP] | Japan | 4-185813 |
| Mar. 4, 1993 | [JP] | Japan | 5-069361 |
| Apr. 15, 1993 | [JP] | Japan | 5-112186 |

[51] Int. Cl.$^6$ .................. G11B 5/71; G11B 5/72
[52] U.S. Cl. ............... 428/64.3; 428/212; 428/315.5; 428/315.7; 428/321.1; 428/336; 428/694 BP; 428/694 TP; 428/694 ML; 428/900
[58] Field of Search ............ 428/694 BP, 694 TP, 428/694 ML, 900, 212, 315.5, 315.7, 321.1, 336, 64.3

[56] References Cited

U.S. PATENT DOCUMENTS

| 4,546,035 | 10/1985 | Ko et al. | 428/315.9 |
| 4,693,908 | 9/1987 | Rossi et al. | 427/130 |
| 4,759,954 | 7/1988 | Kubota et al. | 427/128 |
| 4,913,959 | 4/1990 | Miyake et al. | 428/900 |
| 4,985,295 | 1/1991 | Ishihara et al. | 428/213 |
| 5,045,372 | 9/1991 | Endo et al. | 428/900 |
| 5,112,679 | 5/1992 | Nakagama et al. | 428/900 |
| 5,126,215 | 6/1992 | Aonuma et al. | 428/900 |

FOREIGN PATENT DOCUMENTS

| 860184440 | 2/1988 | Japan . |
| 61-244051 | 4/1988 | Japan . |
| 62-54155 | 9/1988 | Japan . |
| 62-227002 | 3/1989 | Japan . |
| 63-188417 | 2/1990 | Japan . |
| 890077797 | 12/1990 | Japan . |
| 64-118718 | 12/1990 | Japan . |
| 64-118719 | 12/1990 | Japan . |
| 64-149680 | 1/1991 | Japan . |
| 64-171821 | 2/1991 | Japan . |
| 64-197738 | 3/1991 | Japan . |
| 2-175176 | 2/1992 | Japan . |

Primary Examiner—Stevan A. Resan
Attorney, Agent, or Firm—Watson Cole Grindle & Davis

[57] ABSTRACT

A magneto-optical disc includes a substrate, a recording layer, and a protective coating comprised of a resin and a lubricant. The disc is operated for magneto-optical recording in a magnetic field modulation mode such that the protective coating is in sliding contact with a magnetic head. The lubricant is a higher fatty acid ester $R^1$—COO—$R^2$ wherein $R^1$ is a saturated or unsaturated aliphatic $C_{10}$–$C_{30}$ hydrocarbon residue, and $R^2$ is a saturated or unsaturated aliphatic $C_{10}$–$C_{30}$ hydrocarbon residue. Alternatively, the protective coating is formed by curing with radiation a composition containing a lubricant and a radiation-curable compound such that micropores are locally formed in or near the outer surface of the protective coating, the lubricant being distributed in the micropores. In either case, the protective coating is effective for minimizing friction with the magnetic head.

9 Claims, 1 Drawing Sheet

MAGNETO-OPTICAL DISK HAVING A MICROPOROUS PROTECTIVE COATING CONTAINING A LUBRICANT

This application is a File Wrapper Continuation Application of application Ser. No. 08/075,956, filed 14 Jun. 1993 now abandoned.

BACKGROUND OF THE INVENTION

1. Field of the Invention

This invention relates to a magneto-optical recording disc adapted for magneto-optical recording in a magnetic field modulation mode.

2. Prior Art

Optical discs are of great interest as high capacity information carrying media. Among the optical discs, magneto-optical discs of the magnetic field modulation system are expected to find use in data files and other advanced applications. A magneto-optical disc is recorded in a magnetic field modulation mode by directing a laser beam from an optical head to the recording layer of the disc in a DC manner for raising the temperature of the irradiated spot, and applying a modulated magnetic field across the recording layer from a magnetic head opposed to the optical head at the same time. Therefore, the magnetic field modulation mode allows for overwrite recording.

Most of conventional magneto-optical disc drives depend on a contact start and stop (CSS) system using a flying magnetic head. The magnetic head is in contact with the disc surface at the start and end of disc rotation. Thus the disc on the magnetic head facing surface is provided with a protective coating for protecting the magnetic head from adsorption and crushing.

For the protective coatings on magneto-optical discs of the CSS system, various resin compositions were proposed. For example, Japanese Patent Application Kokai (JP-A) Nos. 301040/1990 and 301041/1990 disclose a resin composition predominantly comprising a fluorinated polyurethane resin and JP-A 37844/1991 discloses a resin composition predominantly comprising a fluoro-resin soluble in organic solvents. It is also proposed to incorporate metal elements and lubricants in these resin compositions, the metal elements having greater ionization tendency than the transition metal element of which the recording film is made. JP-A 98857/1988 discloses to incorporate fluorinated carbon lubricant into resins such as epoxy resins. JP-A 40149/1990 discloses UV-curable resins having blended therein lubricants such as higher fatty acid esters (e.g., stearates), higher fatty acids, higher fatty acid amides, and silicone oil, JP-A 17844/1991 discloses a lubricating layer, and JP-A 62338/1991 discloses to disperse fine particulates of silicone resin or nickel on an overcoat layer for uniformly distributing asperities of 0.1 to 0.5 µm high on the surface. JP-A 222349/1988 and 70944/1989 provide an anti-crushing film on a protective film on a magneto-optical recording layer, the anti-crushing film on its surface being provided with a plurality of discrete micropores where the film is impregnated with liquid lubricant. Furthermore, JP-A 64937/1992 discloses a protective layer of a curable resin containing a plurality of voids where the layer is impregnated with lubricant.

Magneto-optical discs capable of recording/reading operation at the same linear velocity as compact discs (CD) are recently highlighted since they can share the drive unit with the CDs simply by adding or modifying the optical system. The CDs employ a linear velocity as low as 1.2 to 1.4 m/sec. at which the magnetic head cannot be aerodynamically lifted. Then the CSS system cannot be resorted to. One would attempt to use a stationary magnetic head which is held at a fixed, close distance from the disc surface. The stationary magnetic head, however, can collide with the disc due to axial runouts of the disc and vibration of the drive unit. Servo means must be provided in order to allow the head to follow axial runouts of the disc, resulting in a complex drive mechanism.

Under the circumstances, we reached the concept of a magnetic head in continuous contact with the disc surface and made research works on a magneto-optical disc capable of such operation. It was found that when the magnetic head was in sliding contact with the disc surface, the protective coatings previously proposed for the CSS system were unsatisfactory.

The protective coating having lubricant incorporated therein fails to retain lubricity for a sufficient time since the magnetic head is in continuous sliding contact with the protective coating surface. More specifically, the fluorinated carbon lubricants disclosed in JP-A 98857/1988 and the conventional stearates among higher fatty acid esters, higher fatty acids or ester amides thereof and silicone oil disclosed in JP-A 40149/1990 suffer from many problems including an increase in coefficient of friction during storage or usage, typically storage at high temperature, noise generation due to head sliding, a loss of dynamic performance, jitter occurrence, and low durability. Attempts to disperse fine particles in a protective coating in order to increase the surface roughness have the problems of noise generation due to head sliding and jitter occurrence. Fine particles of metal or ceramics can cause damage to the magnetic head because of their hardness. Protective coatings with micropores or voids where the coatings are impregnated with lubricant require a special resin material and a complex manufacturing step and have a short effective life because of insufficient durability and friction properties.

SUMMARY OF THE INVENTION

A primary object of the present invention is to provide a magneto-optical disc adapted for operation in continuous sliding contact with a magnetic head and having a protective coating which is resistant against sliding with the magnetic head, minimizes the friction with the magnetic head, and maintains the friction minimizing ability during high temperature storage, during operation and even after contact with alcohols and other chemicals, thus minimizing head sliding noise and jitter.

The present invention is directed to a magneto-optical disc comprising a substrate, a recording layer thereon, and a protective coating on the recording layer. The protective coating is comprised of a resin and a lubricant and has an outer surface remote from the substrate and an inner surface adjacent to the substrate. The disc is operated for magneto-optical recording in a magnetic field modulation mode such that the outer surface of the protective coating is in sliding contact with a magnetic head.

According to a first aspect of the present invention, the lubricant in the protective coating is a fatty acid ester of the formula:

$$R^1\text{---COO---}R^2$$

wherein $R^1$ is a linear or branched-saturated aliphatic hydrocarbon residue having at least 10 carbon atoms or an unsaturated aliphatic hydrocarbon residue having at least 10 carbon atoms, and $R^2$ is a branched saturated aliphatic hydrocarbon residue having at least 10 carbon atoms or an unsaturated aliphatic hydrocarbon residue having at least 10 carbon atoms. Preferably, $R^1$ is a linear saturated aliphatic hydrocarbon residue and $R^2$ is a branched saturated aliphatic hydrocarbon residue, both having 10 to 30 carbon atoms. The fatty acid ester is liquid at room temperature. The fatty acid ester is contained in an amount of 0.1 to 20% by weight of the protective coating. Also preferably, the fatty acid ester is distributed at the outer surface of the protective coating. The protective coating includes micropores in the outer surface and the fatty acid ester is contained within the micropores. A locally varying distribution of the fatty acid ester in the protective coating is preferred. More specifically, the fatty acid ester content in an outside region of the protective coating extending from the outer surface to one-half of its thickness is greater than the fatty acid ester content in an inside region of the protective coating extending from the inner surface to one-half of its thickness. Often the fatty acid ester is present in micropores formed only in the outside region of the protective coating. Further preferably, the resin is a radiation-curable resin. The protective coating has a thickness of 1 to 30 μm.

In a second aspect, the protective coating is obtained by curing with radiation a composition containing a lubricant and a radiation-curable compound such that micropores are locally formed in or near the outer surface of the protective coating remote from the substrate. The lubricant is contained in the micropores in or near the outer surface.

ADVANTAGES OF THE INVENTION

The magneto-optical disc of the invention includes a protective resin coating containing a fatty acid ester having a specific number of carbon atoms and a specific branched or unsaturated structure, the protective resin coating defining a disc surface to be in sliding contact with a magnetic head. The disc which is operated in continuous sliding contact with the magnetic head is fully reduced in friction with the head. Little or no noise generates during sliding motion of the disc across the head and jitter is minimized. After high temperature storage, after operation and even after contact with alcohols and other chemicals, the protective coating is effective for minimizing any increase of friction, sliding noise and jitter. Little or no damage is brought to the magnetic head operating in continuous contact with the disc.

It is to be understood that as will become evident from the Examples, the advantages of the invention are not achievable with the stearate esters of JP-A 17844/1991 if $R^2$ is not as defined above. This is because unlike the present invention, the magneto-optical disc of JP-A 17844/1991 is intended for operation without contact with the magnetic head.

The present invention including the embodiment using the above-defined fatty acid esters favors a protective coating which is obtained by radiation curing a composition containing a lubricant, preferably a fatty acid ester, and a radiation-curable compound such that micropores are locally formed in or near the outer surface of the protective coating remote from the substrate. The lubricant is locally segregated in or near the outer surface. This embodiment provides further improvements in the above-mentioned advantages.

It is to be understood that as will become evident from the Examples, the advantages of the invention are not achievable with the anti-crushing films of JP-A 222349/1988 and JP-A 70944/1989 obtained by curing a composition containing a noncuring material such as liquid paraffin and a curable material, extracting away the non-curing material from the cured film to leave pores, and impregnating the pores with lubricant and the protective layer of JP-A 64937/1992 obtained by curing a curable resin composition having a thermoplastic resin dispersed therein, leaching the thermoplastic resin from the cured film to leave voids and impregnating the voids with lubricant. These disclosures have another disadvantage of complexity of manufacture.

BRIEF DESCRIPTION OF THE DRAWING

The only FIGURE.

DETAILED DESCRIPTION OF THE INVENTION

Figure 1:
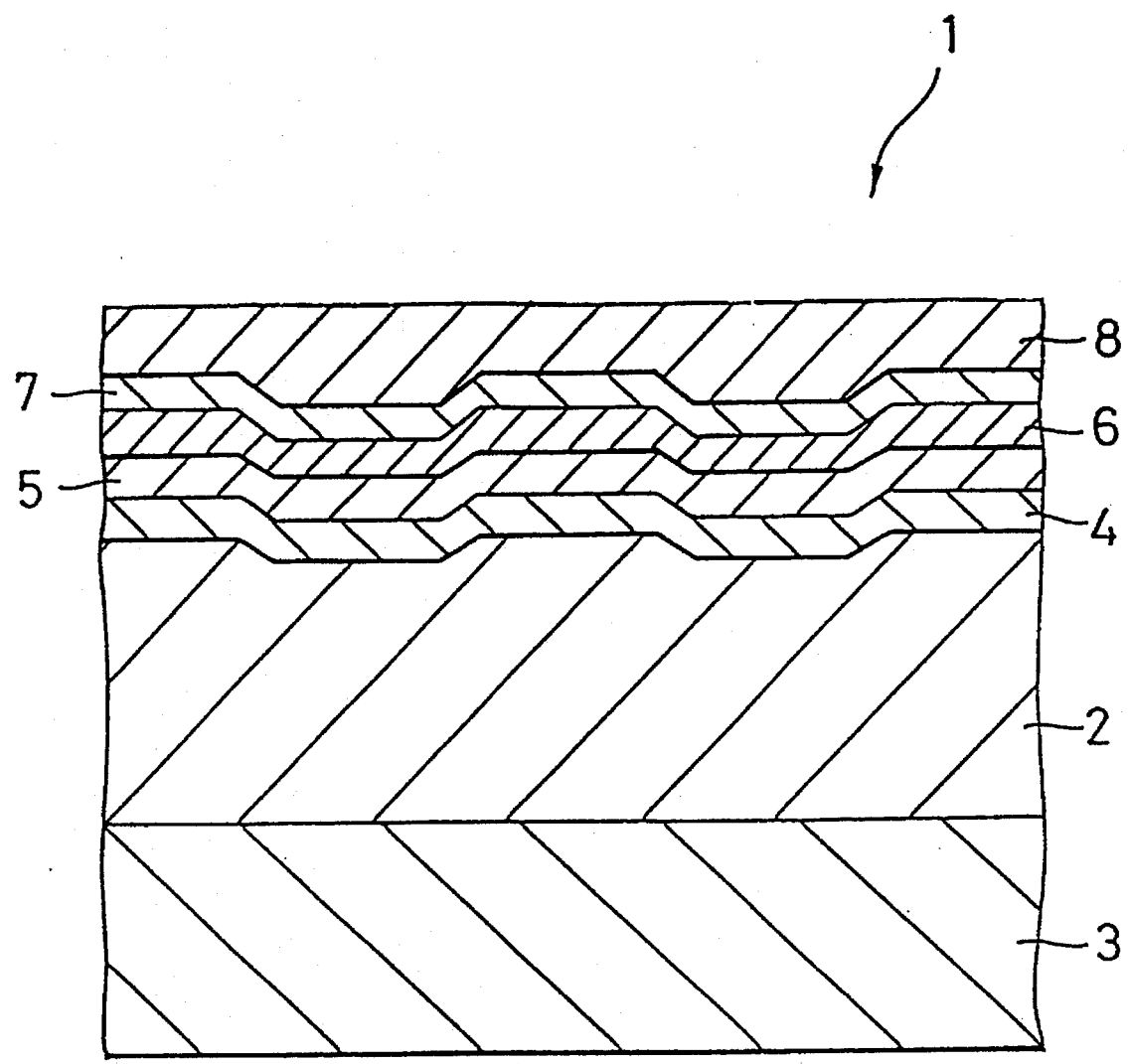
FIG. 1 is a fragmental cross section of a magneto-optical disc according to one preferred embodiment of the invention.

The magneto-optical disc of the present invention includes a recording layer on a substrate and a protective resinous coating disposed adjacent the recording layer.

Referring to FIG. 1, there is illustrated in cross section a portion of a magneto-optical recording disc generally designated at 1 according to one preferred embodiment of the invention. The disc 1 includes a lower protective layer 4, a recording layer 5, an upper protective layer 6, a reflective layer 7, and a protective coating 8 stacked on one major surface of a substrate 2 in the described order. The protective coating 8 has the outer surface remote from the substrate 2 and the inner surface adjacent to the substrate 2, more specifically in close contact with the reflective layer 7 in the illustrated embodiment. Unless otherwise stated, the surface of the protective coating 8 refers to the outer surface. The disc 1 further includes a hard coat 3 on the opposite or rear major surface of the substrate 2. During operation, the disc is driven for rotation such that a magnetic head (not shown) is in continuous sliding contact with the outer surface of the protective coating 8. Usually the magnetic head is supported by suspension means so that the head may follow axial runouts of the rotating disc, maintaining the head in continuous contact with the disc surface.

The protective coating 8 is comprised of a resin, typically a radiation-curable resin and according to the first aspect, contains a fatty acid ester of the following formula.

$$R^1\text{—COO—}R^2 \tag{I}$$

Preferably, $R^1$ is a normal chain or a linear saturated aliphatic hydrocarbon residue having at least 10 carbon atoms, more preferably 10 to 30 carbon atoms, most preferably 11 to 24 carbon atoms. Alternatively, $R^1$ is a branched saturated aliphatic hydrocarbon residue having at least 10 carbon atoms, more preferably 10 to 30 carbon atoms, most preferably 10 to 24 carbon atoms. The branched hydrocarbon may include 1 to 10 branches, preferably 1 to 5 branches which may have any desired number of carbon atoms. Alternatively, $R^1$ is an unsaturated aliphatic hydrocarbon residue having at least 10 carbon atoms, more preferably 10 to 30 carbon atoms, most preferably 12 to 24 carbon atoms. The unsaturated hydrocarbon may include 1 to 3 double bonds, preferably 1 or 2 double bonds which may be at any desired position. Most often the unsaturated hydrocarbon is linear.

Preferably, $R^2$ is a branched saturated aliphatic hydrocarbon residue having at least 10 carbon atoms, more preferably 10 to 30 carbon atoms, most preferably 10 to 24 carbon atoms. The branched hydrocarbon may include 1 to 10 branches, preferably 1 to 5 branches which may have any desired number of carbon atoms. Alternatively, $R^2$ is an unsaturated aliphatic hydrocarbon residue having at least 10 carbon atoms, more preferably 10 to 30 carbon atoms, most preferably 12 to 24 carbon atoms. The unsaturated hydrocarbon may include 1 to 3 double bonds, preferably 1 or 2 double bonds which may be at any desired position. Most often the unsaturated hydrocarbon is linear.

Most preferred are those fatty acid esters of formula (I) wherein $R^1$ is a normal chain saturated aliphatic hydrocarbon residue and $R^2$ is a branched saturated aliphatic hydrocarbon residue since they experience minimal deterioration by high-temperature storage and operation and provide a low coefficient of friction. These fatty acid esters are liquid at room temperature and preferably have a melting point between –40° C. and 20° C., especially between –30° C. and 10° C. The fatty acid esters preferably have about 20 to 40 carbon atoms in total.

Examples of the fatty acid ester are listed in Table 1. These fatty acid esters are commercially available.

TABLE 1

| No. | Designation | $R_1$ | $R_2$ |
|---|---|---|---|
| 1 | isocetyl myristate | $C_{13}H_{27}-$ | $CH_3(CH_2)_7$ $>$ $CHCH_2-$ / $CH_3(CH_2)_5$ |
| 2 | octyldodecyl myristate | $C_{13}H_{27}-$ | $C_8H_{17}$ $>$ $CHCH_2-$ / $C_{10}H_{21}$ |
| 3 | isocetyl stearate | $C_{17}H_{35}-$ | $CH_3(CH_2)_7$ $>$ $CHCH_2-$ / $CH_3(CH_2)_5$ |
| 4 | isotridecyl myristate | $C_{13}H_{27}-$ | $CH_3(CH_2)_7$ $>$ $CHCH_2-$ / $CH_3(CH_2)_2$ |
| 5 | isotridecyl stearate | $C_{17}H_{35}-$ | $CH_3(CH_2)_7$ $>$ $CHCH_2-$ / $CH_3(CH_2)_2$ |
| 6 | isotridecyl laurate | $C_{11}H_{23}-$ | $CH_3(CH_2)_7$ $>$ $CHCH_2-$ / $CH_3(CH_2)_2$ |
| 7 | isocetyl palmitate | $C_{15}H_{31}-$ | $CH_3(CH_2)_7$ $>$ $CHCH_2-$ / $CH_3(CH_2)_5$ |
| 8 | isocetyl laurate | $C_{11}H_{23}-$ | $CH_3(CH_2)_7$ $>$ $CHCH_2-$ / $CH_3(CH_2)_5$ |
| 9 | isotetradecyl stearate | $C_{17}H_{35}-$ | $CH_3(CH_2)_7$ $>$ $CHCH_2$ / $CH_3(CH_2)_3$ |
| 10 | octyldodecyl stearate | $C_{17}H_{35}-$ | $C_8H_{17}$ $>$ $CHCH_2-$ / $C_{10}H_{21}$ |
| 11 | isostearyl stearate | $C_{17}H_{35}-$ | $(CH_3)_3CCH_2CH(CH_3)$ $>$ $CHCH_2-$ / $(CH_3)_3CCH_2CH(CH_3)CH_2CH_2$ |
| 12 | isostearyl myristate | $C_{13}H_{27}-$ | $(CH_3)_3CCH_2CH(CH_3)$ $>$ $CHCH_2-$ / $(CH_3)_3CCH_2CH(CH_3)CH_2CH_2$ |
| 13 | oleyl oleate | $CH_3(CH_2)_7CH=CH(CH_2)_7-$ | $-(CH_2)_3CH=CH(CH_2)_7CH_3$ |

TABLE 1-continued

| No. | Designation | $R_1$ | $R_2$ |
|---|---|---|---|
| 14 | isocetyl oleate | $CH_3(CH_2)_7CH=CH(CH_2)_7-$ | $CH_3(CH_2)_7$<br>$\phantom{CH_3(CH_2)_5}\diagdown$<br>$\phantom{CH_3(CH_2)_5}CHCH_2-$<br>$CH_3(CH_2)_5\diagup$ |
| 15 | isostearyl oleate | $CH_3(CH_2)_7CH=CH(CH_2)_7-$ | $(CH_2)_3CCH_2CH(CH_3)$<br>$\phantom{(CH_3)_3CCH_2CH(CH_3)CH_2CH_2}\diagdown$<br>$\phantom{(CH_3)_3CCH_2CH(CH_3)CH_2CH_2}CHCH_2-$<br>$(CH_3)_3CCH_2CH(CH_3)CH_2CH_2\diagup$ |
| 16 | oleyl laurate | $C_{11}H_{23}-$ | $-(CH_2)_3CH=CH(CH_2)_7CH_3$ |
| 17 | oleyl isostearate | $(CH_3)_3CCH_2CH(CH_3)$<br>$\phantom{(CH_3)_3CCH_2CH(CH_3)CH_2CH_3}\diagdown$<br>$\phantom{(CH_3)_3CCH_2CH(CH_3)CH_2CH_3}CH-$<br>$(CH_3)_3CCH_2CH(CH_3)CH_2CH_3\diagup$ | $-(CH_2)_3CH=CH(CH_2)_7CH_3$ |
| 18 | isocetyl isostearate | $(CH_3)_3CCH_2CH(CH_3)$<br>$\phantom{(CH_3)_3CCH_2CH(CH_3)CH_2CH_3}\diagdown$<br>$\phantom{(CH_3)_3CCH_2CH(CH_3)CH_2CH_3}CH-$<br>$(CH_3)_3CCH_2CH(CH_3)CH_2CH_3\diagup$ | $CH_3(CH_2)_7$<br>$\phantom{CH_3(CH_2)_5}\diagdown$<br>$\phantom{CH_3(CH_2)_5}CHCH_2-$<br>$CH_3(CH_2)_5\diagup$ |
| 19 | isostearyl isostearate | $(CH_3)_3CCH_2CH(CH_3)$<br>$\phantom{(CH_3)_3CCH_2CH(CH_3)CH_2CH_3}\diagdown$<br>$\phantom{(CH_3)_3CCH_2CH(CH_3)CH_2CH_3}CH-$<br>$(CH_3)_3CCH_2CH(CH_3)CH_2CH_3\diagup$ | $(CH_3)_3CCH_2CH(CH_3)$<br>$\phantom{(CH_3)_3CCH_2CH(CH_3)CH_2CH_2}\diagdown$<br>$\phantom{(CH_3)_3CCH_2CH(CH_3)CH_2CH_2}CHCH_2-$<br>$(CH_3)_3CCH_2CH(CH_3)CH_2CH_2\diagup$ |
| 20 | isotridecyl isostearate | $(CH_3)_3CCH_2CH(CH_3)$<br>$\phantom{(CH_3)_3CCH_2CH(CH_3)CH_2CH_3}\diagdown$<br>$\phantom{(CH_3)_3CCH_2CH(CH_3)CH_2CH_3}CH-$<br>$(CH_3)_3CCH_2CH(CH_3)CH_2CH_3\diagup$ | $CH_3(CH_2)_7$<br>$\phantom{CH_3(CH_2)_2}\diagdown$<br>$\phantom{CH_3(CH_2)_2}CHCH_2-$<br>$CH_3(CH_2)_2\diagup$ |

Preferably the fatty acid ester of formula (I) is contained in an amount of about 0.1 to 20% by weight, especially 0.5 to 10% by weight of the protective coating. Though not always, lower contents would be less effective for reducing friction whereas higher contents would provide an undesirable dispersion or cause short curing of the radiation curable resin.

In one preferred embodiment, the fatty acid ester is uniformly dispersed in the protective coating. In another preferred embodiment, the fatty acid ester is locally distributed in a sub-surface stratum of the protective coating, for example, by applying a solution of the fatty acid ester to a protective resinous coating. In the illustrated embodiment of FIG. 1, the protective coating 8 is a single layer, but may include a plurality of sub-layers wherein the fatty acid ester is introduced into a sub-layer or sub-layers disposed on the outer surface side. The protective coating consisting of two or more sub-layers is improved in weathering resistance since pinholes are offset between the sub-layers.

The protective coating of a single or multi-layer structure is preferably formed from a radiation-curable resin. More particularly, it is formed by coating a radiation-curable compound or a polymerizable composition thereof and curing the coating with radiation. The radiation-curable compounds used herein include monomers, oligomers, and polymers having incorporated in their molecule a group capable of crosslinking or polymerization upon exposure to radiation, for example, an acrylic double bond as given by acrylic acid, methacrylic acid and their esters which are sensitive to ionization energy and capable of radical polymerization, an allyl double bond as given by diallyl phthalate, and an unsaturated double bond as given by maleic acid and maleic derivatives. They are preferably polyfunctional, especially at least trifunctional and may be used alone or in admixture of two or more.

The radiation-curable monomers are usually compounds having a molecular weight of lower than 2,000 and the oligomers are those having a molecular weight of 2,000 to 10,000. Examples include acryl-containing monomers and oligomers such as styrene, ethylacrylate, ethylene glycol diacrylate, ethylene glycol dimethacrylate, diethylene glycol diacrylate, diethylene glycol methacrylate, 1,6-hexaneglycol diacrylate, 1,6-hexaneglycol dimethacrylate, and more preferably pentaerythritol tetraacrylate (and methacrylate), pentaerythritol triacrylate (and methacrylate), trimethylolpropane triacrylate (and methacrylate), trimethylolpropane diacrylate (and methacrylate), acryl modified products of urethane elastomers, and derivatives thereof having a functional group such as COOH incorporated therein, acrylates and methacrylates of phenol ethylene oxide adducts, and compounds having a pentaerythritol fused ring having an acryl or methacryl group or ε-caprolactone-acryl group attached thereto as disclosed in Japanese Patent Application No. 72888/1987, and special acrylates as disclosed in Japanese Patent Application No. 72888/1987. Other radiation-curable oligomers include oligoester acrylates, acryl modified urethane elastomers and their derivatives having a functional group such as COOH incorporated therein.

In addition to or instead of the above-mentioned compounds, radiation-curable compounds obtained by modifying thermoplastic resins so as to be radiation sensitive may be used. Examples of such radiation-curable resins include thermoplastic resins having incorporated in their molecule a group capable of crosslinking or polymerization upon exposure to radiation, for example, an acrylic double bond as given by acrylic acid, methacrylic acid and their esters having a radically polymerizable unsaturated double bond, an allyl double bond as given by diallyl phthalate, and an unsaturated bond as given by maleic acid and maleic derivatives. Examples of the thermoplastic resins which can be modified to be radiation curable include vinyl chloride copolymers, saturated polyester resins, polyvinyl alcohol resins, epoxy resins, phenoxy resins, and cellulosic derivatives. Other resins which can be modified to be radiation curable include polyfunctional polyesters, polyether ester resins, polyvinyl pyrrolidone resins and derivatives thereof (e.g., PVP olefin copolymers), polyamide resins, polyimide resins, phenolic resins, spiroacetal resins, and acrylic resins containing at least one acryl ester and methacryl ester containing a hydroxyl group as a polymerizing component.

The radiation to which the coating is exposed may be ultraviolet (UV) radiation, electron radiation, or the like, with UV being preferred. For UV curing, photo-polymerization initiators or sensitizers are generally added to the radiation-curable compounds. Any desired photo-polymerization initiator or sensitizer may be used, for example, acetophenones, benzoins, benzophenones, and thioxanthones. A mixture of photo-polymerization initiators may be used. The polymerizable composition generally contains about 0.5 to 5% by weight of photo-polymerization initiator. Such a polymerizable composition may be synthesized by conventional methods or prepared by mixing commercially available compounds.

Another preferred composition containing a radiation-curable compound of which the protective coating is formed is a composition containing an epoxy resin and a cationic photo-polymerization catalyst. The epoxy resins used herein are preferably alicyclic epoxy resins, especially those having at least two epoxy groups in a molecule. Examples of the alicyclic epoxy resin include 3,4-epoxycyclohexylmethyl-3,4-epoxycyclohexanecarboxylate, bis(3,4-epoxycyclohexylmethyl)-adipate, bis(3,4-epoxycyclohexyl) adipate, 2-(3,4-epoxy-cyclohexyl-5,5-spiro-3,4-epoxy)cyclohexane-meta-dioxane, bis(2,3-epoxycyclopentyl) ether, and vinylcyclohexene dioxide. The alicyclic epoxy resin preferably has an epoxy equivalent of 60 to 300, especially 100 to 200 for better curing though not limited thereto.

Well-known cationic photo-polymerization catalysts may be used. Examples include metal fluoroborate salts, boron trifluoride complexes, bis(perfluoroalkyl sulfonyl)methane metal salts, aryldiazonium compounds, aromatic onium salts of Group 6A elements, aromatic onium salts of Group 5A elements, dicarbonyl chelates of Group 3A to 5A elements, thiopyrilium salts, Group 6A elements having a $MF_6$ anion wherein M is P, As or Sb, triarylsulfonium complex salts, aromatic iodonium complex salts, and aromatic sulfonium complex salts, with the polyarylsulfonium complex salts, aromatic sulfonium and iodonium complex salts of halogen-containing complex ions, and aromatic onium salts of Group 3A, 5A and 6A elements being preferred.

Also useful are cationic photo-polymerization catalysts containing an organometallic compound and a photo-decomposable organic silicon compound. These cationic photo-polymerization catalysts are non-strong acid systems and avoid any detrimental influence to the sensitive recording layer of the optical recording disc. The organometallic compounds include complex compounds having alkoxy, phenoxy, β-diketonato and other groups coordinated to a metal atom such as Ti, V, Cr, Mn, Fe, Co, Ni, Cu, Zn, Al and Zr. Preferred among these are organic aluminum compounds, for example, trismethoxy aluminum, trispropionato aluminum, tristrifluoroacetyl aluminum, and trisethylacetoacetonato aluminum. The photo-decomposable organic silicon compounds yield silanol upon exposure to light such as ultraviolet radiation and include silicon compounds having a peroxysilano, o-nitrobenzyl or α-kitosilyl group. Preferably the composition contains about 0.05 to 0.7 parts, especially about 0.1 to 0.5 parts by weight of the cationic photo-polymerization catalyst per 100 parts by weight of the epoxy resin. More preferably, a composition containing an acryl-containing compound as a radiation curable compound and a photo-polymerization initiator or sensitizer is coated and cured with radiation, typically UV radiation.

In the preferred protective coating, the fatty acid ester is segregated in the radiation-cured resin near the surface. More specifically, the fatty acid ester is preferably present on the protective coating surface. Provided that the protective coating is divided at a level of one-half of its thickness into an outside region which extends from the outer surface to one-half of the thickness and an inside region which extends from the inner surface to-one-half of the thickness, the concentration of fatty acid ester is preferably graded such that the content of fatty acid ester in the outside region (Co) is greater than the content of fatty acid ester in the inside region (Ci). Since the fatty acid ester used herein does not bond with the resin after radiation curing, whether or not it is present on the protective coating surface can be determined by washing the surface with a suitable solvent (e.g., acetone, ethanol, chloroform, toluene, and benzene), or extracting it with ultrasonic wave and fixing it in a gas chromatograph. In this regard, better performance is expected when the amount of fatty acid ester borne on the surface is about 1 to 500 $mg/m^2$.

The fatty acid ester contents in the outside and inside regions (Co and Ci) may be determined by actually cutting the protective coating at a level of one-half of its thickness, extracting each of the outside and inside regions with solvent, followed by gas chromatographic analysis. Alternatively, Co and Ci may be presumed by determining the amounts of fatty acid ester borne at the protective coating outer surface, the cross section at the one-half level of the thickness, and the protective coating inner surface. Preferably, the ratio of Ci/Co is up to 1/5, especially from 0 to 1/10. The segregation or local distribution of the fatty acid ester on the outer surface or in the outside region leads to a lower coefficient of friction, more stable dynamic durability, less generation of sliding noise, and stabilized jitter as well as reduced deterioration of these properties with time during storage or operation.

In the above-mentioned embodiment wherein the fatty acid ester is segregated in the surface region of the protective coating, better results are obtained when the protective coat, especially on the surface, is provided with micropores and the fatty acid ester is contained in the micropores near the surface. In this preferred embodiment, not only the fatty acid ester is segregated in the surface region of the protective coating, but also micropores defining a closed space are distributed at or near the surface, with some micropores being cut off at the coating surface. The micropores are distributed preferably in the outside region of the protective coating, more preferably only in the surface of the protective coating although such local distribution depends on the total thickness of the protective coating. The distribution of micropores only in the surface of the protective coating implies that micropores are formed in the surface while they are open at the surface since they are interrupted thereat. Then there are no or few micropores defining a closed space in the protective coating.

Preferably the micropores have an average diameter of about 0.01 to 1 μm and a depth of about 0.01 to 1 μm. Then the region where micropores are distributed in the protective coating is preferably limited to a depth of up to 2 μm from the surface, more preferably up to 1.2 μm from the surface, especially from 0.01 μm to 1.2 μm below the surface. The population of micropores on the protective coating surface or in a region from the surface to a depth of 2 μm preferably ranges from 50 to 500 pores per 10 $μm^2$ as viewed from above.

It is desirable that micropores are substantially absent in the inside region of the protective coating extending from the lower surface to the half thickness level. Substantial absence of micropores implies that the population of micropores is up to 10 pores per 10 μm³, especially zero.

Micropores formed in the coating surface are preferably filled with the fatty acid ester. In this regard, the fatty acid ester may partially overflow from the pores onto the coating surface and most desirably, the overflowing fatty acid ester forms a film covering the protective coating surface. Such a film is about 10 to 500 nm thick provided that the pore depth is negligible.

In addition to equivalent advantages to the former embodiment wherein the fatty acid ester is segregated in a surface region of the protective coating, the embodiment wherein micropores are formed in or near the protective coating surface and the fatty acid ester is present in the micropores provides an additional advantage of improved retention of lubricating capability. The protective coating experiences a minimal loss of friction properties even after contact with alcohols and other chemicals.

The presence of micropores may be observed under an optical microscope or scanning electron microscope (SEM). Similarly, the diameter, depth, and number per unit area or unit volume of micropores may be determined from an SEM observation.

The amount of fatty acid ester borne on the surface may be the same as in the former embodiment and determined in the same manner as in the former embodiment.

Understandably, if the protective coating includes a plurality of layers, the surface side layer is formed with micropores where the fatty acid ester is contained.

The protective coating 8 is formed on the reflective layer 7 by any desired method, for example, by adding a predetermined amount of liquid fatty acid ester to a resin as mentioned above, typically a radiation curable resin composition and applying the composition to the reflective layer. The application method is not critical and may be selected from conventional well-known methods including spin coating, screen printing, gravure coating, spray coating and dipping. The conditions under which the protective coating is formed may be determined by taking into account the viscosity of a coating composition, the desired coating thickness, and other factors without undue experimentation. Spin coating is preferred for a protective coating of a single layer structure or the lowermost layer of a protective coating of a multi-layer structure. Then mass productivity is improved while the influence of dust and debris is precluded.

Thereafter, the coating is cured by exposing to UV radiation, or by heating and then exposing to UV radiation if desired. Electron radiation may be used instead of UV radiation. Typically, coatings are exposed to UV radiation at an intensity of at least about 50 mW/cm² and a dose of about 200 to 2,000 mJ/cm². The UV radiation source may be any of conventional ones such as mercury lamps. On UV exposure, the compounds undergo radical polymerization.

In order to allow the fatty acid ester to segregate in proximity to the protective coating surface, UV-assisted curing should preferably be slow or relatively retarded so that the fatty acid ester may migrate and gather to a surface stratum during curing. Such slow curing can be accomplished by irradiating UV radiation to an integrated dose of about 200 to 1,000 mJ/cm² so as to give a surface temperature of 30° to 65° C.

In order to form micropores in the surface and distribute the fatty acid ester therein, radiation curing may be done under substantially the same conditions as used for the surface segregation. Exact conditions may be determined by taking into account the type of fatty acid ester and resin and a ratio of these components in a coating composition. Since the fatty acid ester is compatible with the resin in the coating composition before curing, the spin coating and curing conditions are controlled such that micropores may be formed in the surface and the fatty acid ester be collected therein.

As mentioned above, the present invention favors the use of a protective coating which has micropores formed in or near the surface and the lubricant segregated on or near the surface both as a result of radiation curing. The preferred lubricant is a fatty acid ester of formula (I). Another liquid lubricant may be used instead of the fatty acid ester of formula (I) insofar as the protective coating is formed to have a distribution of micropores as mentioned above. Examples of the liquid lubricant used herein include modified silicone lubricants (e.g., dimethylpolysiloxane modified at either end or branches with alcohols and amines), modified fluorinated lubricants (e.g., perfluoroethers modified at branches or either end with alcohols, amines and carboxy), fatty acid lubricants (e.g., branched fatty acids such as neodecanoic acid, neotridecanoic acid, and isostearic acid), and fatty acid esters other than those of formula (I) (e.g., fatty acid esters of polyhydric alcohols such as trimethylolpropane triiso stearate, glyceryl tri-2-ethylhexanoic acid, and penta erythritol tetra-2-ethylhexanoic acid). The content of the other liquid lubricant in the protective coating may be the same as that of the fatty acid ester of formula (I), with equivalent results.

The protective coating preferably has a (total) thickness of 1 to 30 μm, more preferably 2 to 20 μm. Though not always, thinner coatings might be sometimes difficult to form to uniform thickness and less durable whereas thicker coatings might crack due to shrinkage upon curing and cause warpage of the disc. In addition, thicker coatings have a likelihood that the resin might have cured before segregation of the lubricant (e.g., fatty acid esters) on the surface or without leaving micropores.

Now the remaining components of the disc are described.

The substrate 2 is generally formed of glass or transparent resins such as polycarbonate, acrylic resins, amorphous polyolefins, and styrene resins. Such a choice is made because the magneto-optical disc of the invention is recorded and read by using an optical head positioned on the rear surface side of the substrate 2 (the lower side in FIG. 1) and directing a laser beam to the recording layer 5 through the substrate 2. The surface of the substrate 2 on which the recording layer 5 is formed is conventionally provided with grooves and pits for tracking and addressing purposes.

The lower and upper protective layers 4 and 6 are effective for improving C/N and protecting the recording layer against corrosion and generally have a thickness of about 30 to 300 nm. Although the provision of such protective layers is not critical to the invention, it is desired to form either one of the lower and upper protective layers, especially both. The protective layers may be formed from dielectric materials such as oxides, carbides, nitrides, sulfides and mixtures thereof and by conventional gas phase deposition methods such as sputtering, evaporation, and ion plating.

The recording layer 5 disposed between the substrate 2 and the protective coating 8, more specifically between the first and second dielectric layers 4 and 6 is one in which information can be magnetically recorded using a modulated magnetic field and the recorded information be read through magneto-optical conversion. The recording layer 5 may be formed of any desired material which is capable of such magneto-optical recording. Preferably, it is prepared by depositing an alloy containing a rare earth metal element, especially a rare earth metal-transition metal alloy by sputtering, evaporation or ion plating, preferably by sputtering, to form an amorphous film. Some preferred examples of the recording layer composition are TbFeCo, DyTbFeCo, NdDyFeCo, and NdGdFeCo. The recording layer is generally about 10 to 1,000 nm thick.

The reflective layer 7 is optionally disposed on the second dielectric layer 6 and formed of any of relatively high reflectivity metal materials which include Au, Ag, Pt, Al, Ti, Cr, Ni and Co and alloys or compounds thereof. The reflective layer may be formed in a similar manner to the recording layer 5. The reflective layer is generally about 30 to 200 nm thick.

On the rear surface of the substrate 2 is formed a transparent hard coating 3 as shown in FIG. 1, if desired. The composition and thickness of the hard coating are the same as the protective coating 8 except for the fatty acid ester. Preferably the hard coating 3 is rendered antistatic by adding a surfactant or the like. The hard coating may be disposed not only on the rear surface of the substrate, but also on the inner and outer peripheral edges of the disc.

EXAMPLE

Examples of the present invention are given below by way of illustration and not by way of limitation.

Example 1

Magneto-optical disc samples, Nos. 1–4 and 11–14, were prepared as reported in Table 2.

First, a disc-shaped polycarbonate substrate having an outer diameter of 64 mm, an inner diameter of 11 mm and a recording area thickness of 1.2 mm was coated on one major surface and outer and inner peripheral edges with a hard coating composition which was cured with UV radiation to form a hard coating of about 5 μm thick.

Next a first protective layer of SiNx was deposited on the opposite major surface of the substrate by RF magnetron sputtering to a thickness of 80 nm. A recording layer of the composition: $Tb_{23}Fe_{72}Co_5$ was then deposited on the first protective layer by sputtering to a thickness of 20 nm. A second protective layer of the same composition as the first one was deposited on the recording layer by RF magnetron sputtering to a thickness of 20 nm. An aluminum alloy reflective layer of 80 nm and a protective coating were then provided on the second protective layer.

The protective coating was formed by spin coating the following polymerizable composition and exposing the coating to UV radiation in a dose of 500 mJ/cm² for curing. The coating reached a surface temperature of 55° C. At the end of curing, the protective coating had an average thickness of about 5 μm.

| Polymerizable composition | Parts by weight |
| --- | --- |
| Oligoester acrylate (Mw 5,000) | 50 |
| Trimethylolpropane triacrylate | 50 |
| Acetophenone photopolymerization initiator | 3 |
| Fatty acid ester (shown in Table 2) | 3 |

A comparative sample designated No. 15 was prepared by the same procedure as above except that 5 parts by weight of silicon dioxide fine particles having a mean particle size of 1.0 μm were dispersed instead of the fatty acid ester.

The samples were evaluated for a coefficient of dynamic friction, sliding noise and high-temperature storage stability by the following methods.

(1) Coefficient of Dynamic friction

Using a 3.5" magnetic disc drive (manufactured by Plus K. K.), the disc was rotated at a linear velocity of 1.4 m/sec. The stress applied to the head under a load of 2 grams was measured, from which a coefficient of dynamic friction μ was calculated.

(2) Sliding Noise

Using a 3.5" magnetic disc drive (manufactured by Plus K. K.), the disc was rotated in sliding contact with the head at a linear velocity of 1.4 m/sec. for detecting sliding noise.

(3) High-Temperature Storage Test

The disc sample was stored for 4 days at 85° C. and RH~0% before the measurement of a coefficient of dynamic friction and sliding noise detection.

The results are shown in Table 2.

TABLE 2

| Sample No. | Fatty acid ester | | | mp (°C.) | Coefficient of friction | | Sliding noise | |
| --- | --- | --- | --- | --- | --- | --- | --- | --- |
| | Compound | $R_1$ | $R_2$ | | Initial (25° C.) | After 85° C./4 day storage | Initial | After 85° C./4 day storage |
| 1 | Isocetyl myristate | $C_{13}$ saturated | $C_{16}$ branched | −20.7 | 0.18 | 0.22 | nil | nil |
| 2 | Octyldodecyl myristate | $C_{13}$ saturated | $C_{20}$ branched | −10.0 | 0.21 | 0.25 | nil | nil |
| 3 | Isocetyl stearate | $C_{17}$ saturated | $C_{16}$ branched | −3.0 | 0.20 | 0.24 | nil | nil |
| 4 | Oleyl oleate | $C_{17}$ unsaturated | $C_{17}$ unsaturated | −5.0 | 0.25 | 0.29 | nil | nil |
| 11 (comparison) | Butyl stearate | $C_{17}$ saturated | $C_4$ linear | 24.0 | 0.20 | 0.8 | nil | some (flaw) |
| 12 (comparison) | Cetyl caprylate | $C_8$ saturated | $C_{16}$ linear | −5.0 | 0.21 | 0.9 | nil | some (flaw) |
| 13 (comparison) | Myristyl myristate | $C_{13}$ saturated | $C_{14}$ linear | 42.0 | 0.27 | 0.33 | noisy (head flaw) | noisy (head flaw) |
| 14 (comparison) | Butyl myristate | $C_{13}$ saturated | $C_{14}$ linear | 5.0 | 0.30 | 0.9 | nil | some (flaw) |
| 15 (comparison) | $SiO_2$ particle dispersed | — | — | — | 0.19 | 0.21 | noisy (head flaw) | noisy (head flaw) |

The effectiveness of the invention is evident from Table 2.

Example 2

Samples were prepared by the same procedure as in Example 1 except that the protective coating was formed from the following polymerizable composition which was cured at a UV dose of 500 mJ/cm² and a surface temperature of 40° C.

| Polymerizable composition | Parts by weight |
| --- | --- |
| Oligoester acrylate (Mw 5,000) | 20 |
| Trimethylolpropane triacrylate | 30 |

-continued

| Polymerizable composition | Parts by weight |
|---|---|
| Diethyleneglycol diacrylate | 50 |
| Acetophenone photopolymerization initiator | 3 |
| Fatty acid ester (shown in Table 3) | 3 |

These samples were found to have the fatty acid ester segregated on the surface, with $C_o > C_i$. For all the samples, the amount of fatty acid ester borne on the surface was presumed to be about 200 mg/m² as confirmed by gas chromatography.

These samples were found to have micropores formed in the surface which were filled with the fatty acid ester. The fatty acid ester formed a film of 100 nm thick covering the protective coating surface. The micropores were distributed in a surface stratum from the surface to a depth of 1 μm and had an average diameter of 0.2 μm and an average depth of 0.3 μm. There were 150 micropores/10 μm² as viewed from above. No micropores were found in the protective coating except for the surface stratum. These findings were derived from observations under an optical microscope and SEM.

The samples were evaluated by tests (1) to (3) and the following tests (4) to (6).

(4) Jitter

There were used a disc drive unit DDU-1510 manufactured by Pulstech Industry K. K. and a jitter meter LJM-1851 manufactured by Leader Electronic Industry K. K. While rotating the disc at a circumferential linear velocity of 1.4 m/sec., EFM signals were recorded by irradiating continuous laser light of 780 nm and applying a magnetic field of 200 Oe for modulation. The recording power was 4.5 mW. The jitter of recorded 3T signals was measured at the initial and after storage in (3), that is, 85° C. /RH 0%/4 day storage.

(5) Durability

Using the same drive as above, the disc sample was rotated at 670 rpm at a temperature of 70° C. for measuring the time passed until a coefficient of friction of 0.3 was reached. The number of durable passes was calculated from the time.

(6) Chemical Resistance

The disc sample on the surface was washed with ethanol before a coefficient of friction was measured as in (1).

The results are shown in Table 3.

tective layer in accordance with Example 1 of JP-A 64937/1992. These conventional samples were evaluated by the same tests as above, finding inferior performance to the inventive samples of Table 3. These conventional samples were disadvantageously complex and cumbersome to manufacture as compared with the inventive samples.

Although some preferred embodiments have been described, many modifications and variations may be made thereto in the light of the above teachings. It is therefore to be understood that within the scope of the appended claims, the invention may be practiced otherwise than as specifically described.

We claim:

1. A magneto-optical disk comprising a substrate, a recording layer thereon, and a protective coating on the recording layer containing a lubricant and a resin, said lubricant being a fatty acid ester of 0.1–20% by weight of the protective coating and liquid at ambient temperature, the disc being operated for magneto-optical recording in a magnetic field modulation mode such that the protective coating is in sliding contact with a magnetic head, said protective coating is formed by curing with radiation a composition containing a lubricant and a radiation-curable compound such that micropores are locally formed in or near the outer surface of said protective coating remote from the substrate to a depth of up to 2 μm from the surface of the protective coating, the lubricant being distributed in the micropores and the micropores have a population on the protective coating surface or in a region from the surface to a depth of 2 μm ranging from 50 to 500 pores/10 μm² and is up to 10 pores/μm³ in the inside region of the protective coating extending from the lower surface to the half thickness level and the micropores have an average diameter of approximately 0.01 μm to 1 μm and an average depth of about 0.1 μm to 1 μm.

2. A magneto-optical disk of claim 1, wherein said recording layer has magneto-optic properties, said recording layer has an outer surface remote from the substrate and an inner surface adjacent to the substrate, wherein the protective coating contains a resin and a fatty acid ester of the formula:

$$R^1-COO-R^2$$

and wherein $R^1$ is a normal chain or branched saturated aliphatic hydrocarbon residue having at least 10 carbon

TABLE 3

| Sample No. | Fatty acid ester Compound | Coefficient of friction | | Sliding noise | | Jitter (ns) | | Durability (70° C.) | Coefficient of friction after alcohol washing |
|---|---|---|---|---|---|---|---|---|---|
| | | Initial (25° C.) | After 85° C./4 day storage | Initial | After 85° C./4 day storage | Initial | After storage | | |
| 21 | Isocetyl myristate | 0.14 | 0.20 | nil | nil | 28 | 33 | >2 × 10⁶ passes | 0.28 |
| 22 | Octyldodecyl myristate | 0.17 | 0.22 | nil | nil | 32 | 35 | >2 × 10⁶ passes | 0.29 |
| 23 | Isocetyl stearate | 0.15 | 0.24 | nil | nil | 30 | 36 | >2 × 10⁶ passes | 0.28 |
| 24 | Oleyl oleate | 0.20 | 0.27 | nil | nil | 33 | 37 | >2 × 10⁶ passes | 0.30 |

As is evident from Table 3, more advantages are obtained when the fatty acid ester is segregated by forming micropores in the surface and distributing the fatty acid ester in the micropores.

There were prepared a sample having an anti-crushing film in accordance with Example 1 of JP-A 222340/1988, a sample having a protective film in accordance with Example of JP-A 70944/1989, and a sample having a resinous proatoms or an unsaturated aliphatic hydrocarbon residue having at least 10 carbon atoms, and $R^2$ is a branched saturated aliphatic hydrocarbon residue having at least 10 carbon atoms or an unsaturated aliphatic hydrocarbon residue having at least 10 carbon atoms, said fatty ester is liquid at ambient temperature, is contained in an amount of substantially 0.1 to 20% by weight of the protective coating and is distributed at the outer surface/inner surface of the protective coating in the ratio Ci/Co=0–1/5, wherein Ci and Co are the respective contents of fatty ester in the inside and outside regions of the protective coating, respectively, and said protective coating has a thickness of approximately 1 to 30 µm.

3. A magneto-optical disc comprising a substrate, a magneto-optic recording layer thereon, and a protective coating on the magneto-optic recording layer having an outer surface remote from the substrate and an inner surface adjacent to the substrate, said outer surface including micropores, the disc being operated for magneto-optic recording in a magnetic field modulation mode such that the protective coating on the outer surface is in sliding contact with a magnetic head, wherein the protective coating contains a resin and a fatty acid ester of the formula:

$R^1-COO-R^2$ and wherein $R^1$ is a normal chain or branched saturated aliphatic hydrocarbon residue having at least 10 carbon atoms or an unsaturated aliphatic hydrocarbon residue having at least 10 carbon atoms, and $R^2$ is a branched saturated aliphatic hydrocarbon residue having at least 10 carbon atoms or an unsaturated aliphatic hydrocarbon residue having at least 10 carbon atoms, said fatty ester is liquid at ambient temperature, is contained in an amount of substantially 0.1 to 20% by weight of the protective coating and is distributed in said micropores, said micropores having an average diameter of approximately 0.01 to 1 µm and an average depth of about 0.01 µm to 1 µm and a population of 50–500 pores/10 µm² in a region from the surface of the protective coating to at least one of the depth of 2 µm or the thickness of said protective coating where said thickness is less than 2 µm, and is up to 10 pores/µm³ in the inside region of the protective coating extending from the lower surface to the half thickness level, and said protective coating has a thickness of approximately 1 to 30 µm.

4. The disc of claim 3, wherein $R^1$ is a normal chain of staturated aliphatic hydrocarbon residue and $R^2$ is a branched saturated aliphatic hydrocarbon residue.

5. The disc of claim 4, wherein the hydrocarbon residues represented by $R^1$ and $R^2$ each have 10 to 30 carbon atoms.

6. The disc of claim 3, wherein the hydrocarbon residues represented by $R^1$ and $R^2$ each have 10 to 30 carbon atoms.

7. The disc of claim 3, wherein the content of said fatty acid ester in an outside region of the protective coating extending from the outer surface to one-half of its thickness is greater than the content of said fatty acid ester in an inside region of the protective coating extending from the inner surface to one-half of its thickness.

8. The disc of claim 3, wherein said resin is a radiation-curable resin.

9. A magneto-optical disk of claim 3, wherein said fatty ester is further distributed at the outer surface/inner surface of the protective coating in the ratio Ci/Co=0–1/5, wherein Ci and Co are the respective contents of fatty ester in the inside and outside regions of the protective coating, respectively.

* * * * *